Sept. 19, 1961 A. VAN SCHOOR ET AL 3,000,780
FUNGICIDAL COMPOUND OF THE FORMULA 8 4 3
Filed April 28, 1959
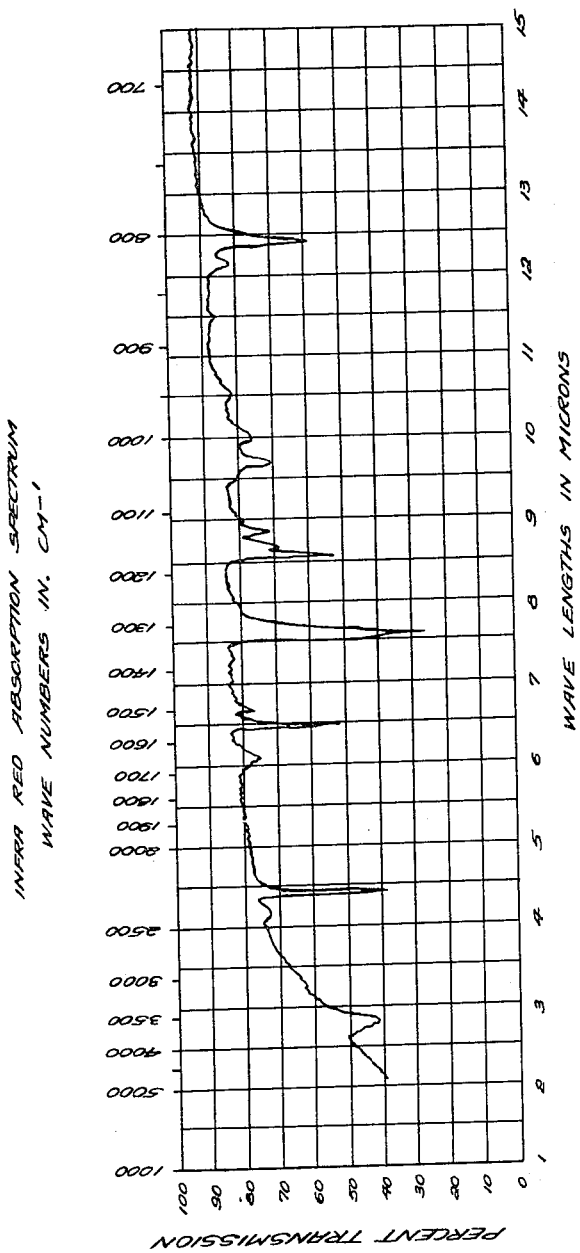
INVENTORS
ALBERT VAN SCHOOR,
ERNST JACOBI,
SIEGMUND LUST,
HORST FLEMMING,
OTTO W. MÜLLER,
BY Bailey, Stephens & Huettig
ATTORNEYS

3,000,780
FUNGICIDAL COMPOUND OF THE FORMULA C₈N₄S₃

Albert van Schoor, Traisa, near Darmstadt, and Ernst Jacobi, Siegmund Lust, Horst Flemming, and Otto Wilhelm Müller, Darmstadt, Germany, assignors to E. Merck Aktiengesellschaft, Darmstadt, Germany
Filed Apr. 28, 1959, Ser. No. 809,481
2 Claims. (Cl. 167—33)

The present invention relates to a novel fungicidal sulfur containing cyanide compound of the formula $C_8N_4S_3$ and to fungicidal compositions containing the same.

The novel compound is derived from 1,2-dimercapto-1,2-dicyan-ethane. It can, for example, be prepared by treating the disodium salt of 1,2-dimercapto-1,2-dicyan-ethene with a suitable oxidizing agent or a compound containing reactive halogen, such as, for example, an acid chloride or 1,2-dibromo-2-phenyl-ethyl methyl ketone.

The novel compound can also be prepared by treating the intermediate product of 1,2-dimercapto-1,2-dicyan-ethene, namely, the sodium salt of cyan-dithio-formic acid of the formula

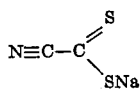

or other alkali metal salts thereof with an oxidizing agent.

The compound of the composition $C_8N_4S_3$ is produced by both methods in the form of yellow crystals having a melting point of about 181–183° C. The compound is insoluble in water and petroleum ether but is soluble in acetone, methylene chloride, chloroform, ethyl acetate, benzene and hot alcohol. Evidently an oxidation product of 1,2-dimercapto-1,2-dicyan-ethene is concerned. The empirical formula and infrared absorption spectrum do not exclude that the compound may be of the formula:

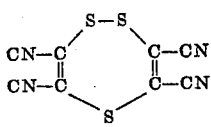

The ultra violet spectrum of the compound according to the invention has four distinct maxima at the wave lengths indicated in the following together with the associated molar extinctions:

347 mμ: ε=5,460
284.5 mμ: ε=7,410
236.5 mμ: ε=11,300
216 mμ: ε=11,700

Biological tests have shown that the compound according to the invention possesses excellent fungicidal and fungistatic activity with a very broad effective spectrum. The compound, for example, was found effective against fungi of such widely varying types as *Rhizoctonia solani*, *Venturia inaequalis* and *Alternaria sp.* It is also, for example, excellently suited for seed disinfection. Furthermore, it is extremely well tolerated by plants. No phytotoxic damage was observed on bush beans, tomato plants, 1 yr. sylvaner grape vines and geranium plants when a 1% spray of such compound was applied to such plants growing in a greenhouse. Furthermore, the fungicidal activity of the compound is vastly superior to that of other recognized fungicides. In comparative tests with tetramethyl-thiuramdisulfide and N-trichloro-thio-tetrahydro-phthalimide on various test fungi it was found that the fungicidal activity of the compound according to the invention was ten times greater and that its fungicidal activity was seven times greater than that of zinc methyl dithiocarbamate.

The novel fungicidal compound according to the invention can be incorporated in the usual forms of compositions employed in the control of fungi, such as, for example, sprays, dusts which are prepared by the addition of the usual adjuvant fillers and/or diluents. Also, solutions or emulsions of the compound, which can be dispersed by the aerosol process, can be prepared with the aid of the usual solvents. All forms of application in general contain from about 1% to at most about 95% of the active novel compound.

The accompanying drawing shows the infrared absorption spectrum of the novel sulfur containing cyanide of the composition $C_8N_4S_3$ according to the invention in KBr.

The following examples will serve to illustrate several modes of preparation of the novel compound according to the invention and fungicidal compositions containing the same.

*Example 1*

10 g. of the disodium salt of 1,2-dimercapto-1,2-dicyan ethene were suspended in 100 cc. of acetone and the suspension cooled to −20° C. 15 grams of bromine vapor were introduced therein over a period of 2 hours and the mixture stirred further until all of the bromine had reacted. The acetone was then distilled off and water was added to the residue to effect crystallization thereof. The crude product had a melting point of 161–220° C. It was purified by recrystallization from benzene to produce a yellow crystalline product having a melting point of 181–183° C. Methylene chloride or alcohol can also be used for such recrystallization.

*Example 2*

12 g. of 3% $H_2O_2$ were diluted with 100 cc. of 2 n HCl, and a solution of 1.8 g. of the disodium salt of 1,2-dimercapto-1,2-dicyan ethene in 25 cc. of water was slowly dropped in over a 45 minute period while maintaining a temperature of 0–5° C. The mixture was stirred for a further 15 minutes at the same temperature. The crystals which separated out melt at 140° C. Yellow crystals having a melting point of 180° C. were obtained therefrom by recrystallization from ethyl acetate. The compound was identical with that obtained in Example 1.

*Example 3*

A mixture of the disodium salt of 1,2-dimercapto-1,2-dicyan-ethene and toluene sulfonic acid chloride in a molar ratio of 1.2:2 was heated to boiling in acetone for 10 hours. The reaction product was purified by chromatographing over silica gel. Crystals were obtained from the middle fraction which after repeated recrystallization from ethyl acetate melted at 181° C.

*Example 4*

9.8 g. of 1,2-dibromo-2-phenyl-ethyl methyl ketone were dissolved in 50 cc. of acetone and 8.2 g. of the disodium salt of the 1,2-dimercapto-1,2-dicyan-ethene added thereto at 20° C. while cooling the reaction mixture. The reaction mixture was then permitted to stand for 16 hours at 20° C. and then boiled for ½ an hour. The NaBr produced was filtered off on a suction filter and filtrate freed of solvent. The residue was taken up in methylene chloride, washed with water, dried with $CaCl_2$ and treated with active carbon. The product was then fractionated chromatographically in a benzene solution over silica gel. The middle fractions gave crystals of a melting point of 173–176° C. which after recrystallization from benezene melted at 181–183° C. These

Example 5

80 g. of carbon disulfide were dissolved in 375 g. of dimethylformamide and slowly reacted with 50 g. of sodium cyanide. Thereafter 270 g. of iron III chloride ($FeCl_3 \cdot 6H_2O$) were slowly added. After the exothermic reaction was completed, water was added and after longer standing the crystalline substance was filtered off on a suction filter. After separating off the sulfur with the aid of carbon disulfide and recrystallization from ethyl acetate it had a composition of $C_8N_4S_3$ and melted at 181–183° C. The U.V. absorption maxima thereof were at 347, 284.5, 236.5 and 216 m$\mu$.

The sulfur can also be removed from the crude product by extraction of the $C_8N_4S_3$ compound with acetone. Also, instead of splitting off the sulfur with water, it can be split off by addition of chloroform. In this instance the $C_8N_4S_3$ compound produced does not crystallize out, but can be recovered from the chloroform solution.

Example 6

80 g. of carbon disulfide were dissolved in 375 g. of dimethylformamide and slowly reacted with 50 g. of sodium cyanide. Thereafter 40 g. of manganese dioxide (80–90%), 90 g. of glacial acetic acid and 50 g. of acetic acid anhydride were slowly added while stirring. After the exothermic action had completed 750 g. of water were added and the mixture allowed to stand overnight.

The crystalline substance was filtered off and after removal of sulfur as in Example 5 and recrystallization from ethyl acetate it had a composition of $C_8N_4S_3$ and melted at 181–183° C. The U.V. absorption maxima thereof were at 347, 285.5, 236.5 and 216 m$\mu$.

Example 7

80 parts by weight of the sulfur containing cyanide $C_8N_4S_3$, 10 parts by weight of kaolin, 8 parts by weight of powdered dried sulfite waste liquor and 2 parts by weight of isobutyl naphthalene sodium sulfonate were ground together to form a fine powder. This powder upon admixture with water to form a dilute suspension (about 1% of active substance) was suited for spraying plants to be protected from attack by fungi.

Example 8

A mixture of 30 parts by weight of the sulfur containing cyanide $C_8N_4S_3$, 10 parts by weight of colophony and 60 parts by weight of kaolin was finely ground. The powder was excellently suited as a seed grain disinfecting powder and adhered well to the seed treated therewith.

Example 9

A mixture of 10 parts by weight of the sulfur containing cyanide $C_8N_4S_3$ and 10 parts by weight of kaolin was finely ground and mixed with 80 parts by weight of powdered talc. The resulting powdered product was excellently suited as a dusting powder.

Example 10

25 parts by weight of the crude product consisting of about 60% of $C_8N_4S_3$ and 40% of S were mixed with 60 parts by weight of flowers of sulfur and 15 parts by weight of 1,5-endomethylene-3,7-dinitroso-1,3,5,7-tetra-azo-cyclooctane. When this powder was heated flamelessly to about 200° C. it produced an aerosol which deposits as a fine coating on surfaces subjected to such aerosol.

We claim:

1. A method of controlling the growth of fungi on materials subject to fungal growth which comprises applying thereto an effective amount of a sulfur containing cyanide of the formula $C_8N_4S_3$ having a melting point of about 181–183° C., said compound being insoluble in water and petroleum ether but soluble in acetone, methylene chloride, chloroform, ethyl acetate, benzene and hot alcohol and the ultra violet spectrum of said compound having four distinct absorption maxima at the following wave lengths 347 m$\mu$, 284.5 m$\mu$, 236.5 m$\mu$ and 216 m$\mu$ and the infra red absorption spectrum of said compound being substantially in accordance with the spectrum given in the accompanying drawing.

2. A sulfur containing cyanide of the formula $C_8N_4S_3$ having a melting point of about 181–183° C., said compound being insoluble in water and petroleum ether but soluble in acetone, methylene chloride, chloroform, ethyl acetate, benzene and hot alcohol and the ultra violet spectrum of said compound having four distinct absorption maxima at the following wave lengths 347 m$\mu$, 284.5 m$\mu$, 236.5 m$\mu$, and 216 m$\mu$ and the infra red absorption spectrum of said compound being substantially in accordance with the spectrum given in the accompanying drawing.

No references cited.